United States Patent [19] [11] 4,019,620
Frenkel et al. [45] Apr. 26, 1977

[54] METHOD AND APPARATUS FOR SEPARATING A PALLETIZED ARRAY OF CONTAINERS INTO SINGLE FILE LINE

[75] Inventors: Robert Leland Frenkel, Englewood; Peter Vischer, Golden; James Allen Gulka, Arvada, all of Colo.

[73] Assignee: Coors Container Company, Golden, Colo.

[22] Filed: Feb. 23, 1976

[21] Appl. No.: 660,722

[52] U.S. Cl. .............................. 198/399; 198/447; 198/451; 214/8.5 R
[51] Int. Cl.² ...................................... B65G 47/00
[58] Field of Search ................. 198/29, 30, 35, 32, 198/31 R, 31 AA, 40, 232, 282, 283, 235, 34, 268, 374, 411, 415, 416, 443, 445, 447, 451, 448, 399, 450; 214/6 P, 8.5 R

[56] References Cited

UNITED STATES PATENTS

| | | | |
|---|---|---|---|
| 2,841,269 | 7/1958 | Jenney et al. | 198/268 |
| 2,978,092 | 4/1961 | Phillips et al. | 198/32 |
| 3,068,989 | 12/1962 | Packman et al. | 198/268 |
| 3,286,815 | 11/1966 | Shuster et al. | 198/34 |
| 3,523,604 | 8/1970 | Babunovic et al. | 198/450 |
| 3,831,733 | 8/1974 | Howard et al. | 198/32 |

FOREIGN PATENTS OR APPLICATIONS

2,427,818  2/1976  Germany .......................... 198/411

Primary Examiner—Evon C. Blunk
Assistant Examiner—Joseph E. Valenza
Attorney, Agent, or Firm—Bruce G. Klaas

[57] ABSTRACT

A method and apparatus for separating a generally rectangular array of containers into a single file line of similarly oriented single file containers. The array is comprised of a plurality of rectangular containers, some having transverse orientations and some having longitudinal orientations. The method of the invention includes advancing all the containers of the array into a number of lines of advancing containers, turning the containers with transverse orientations to longitudinal orientations, and converging the various transversely spaced and longitudinally oriented containers into a single file line of longitudinally oriented containers. The apparatus for practicing the invention may include a number of successive conveyor stations each having various conveyor means such as belts or rollers which sequentially advance the containers generally in a longitudinal path of movement. The conveyor means separates the containers into a number of multiple generally parallel separate paths of movement and changes the orientation of certain ones of the containers to subsequently effect a common orientation of all the containers. The conveyor means also combines the commonly oriented containers in the separate paths of movement into one row in a single path of movement wherein all the containers are in a commonly oriented relationship.

37 Claims, 4 Drawing Figures

Fig_3A

Fig_3B

METHOD AND APPARATUS FOR SEPARATING A PALLETIZED ARRAY OF CONTAINERS INTO SINGLE FILE LINE

BACKGROUND AND SUMMARY OF THE INVENTION

This invention relates to package or container handling and more particularly to a method and apparatus for separating the individual containers from a palletized or generally rectangular array of containers.

Containers of a generally rectangular shape are frequently stacked on pallets to facilitate easy transportation and movement by a fork-lift truck or the like for shipping, storage and other purposes. The palletized stack of containers typically consists of a number of vertical layers of containers and the containers of each layer are arranged in a predetermined array. The predetermined array of each layer includes containers arranged with both transverse and longitudinal orientations to form the generally rectangular shape which is usually almost square. The transverse and longitudinal orientations of each array provide the beneficial aspect of causing some of the containers in one array or level in the stack to be perpendicular to the containers of the levels above and below it in the stack which helps give the stack strength and rigidity, prevents individual containers from falling out of the stack and facilitates keeping of the stack intact during shipment and movement.

Objectives of the present invention relate to depalletizing or separating the individual containers in an array, arranging the containers for convenient use in rapid processing situations, arranging the containers of the array in a single line in single file order, rapidly separating the containers while avoiding jam-ups or the like, and accomplishing the separation under conditions of high operating speeds whereby successive numbers of arrays in a stack may be separated.

The present invention which accomplishes these and other objectives may be summarized as a method and apparatus involving advancing of the containers of the array, turning certain of the containers to effect a common orientation of all the containers and combining and converging the commonly oriented containers, which may be in a plurality of lines or paths of movement, into a single line in single file order.

A more complete understanding of the invention and other objectives and advantages may be obtained from the following detailed description of a preferred embodiment of the invention and from the brief description of the drawings.

DETAILED DESCRIPTION OF A PREFERRED EMBODIMENT OF THE INVENTION

Figure 1:
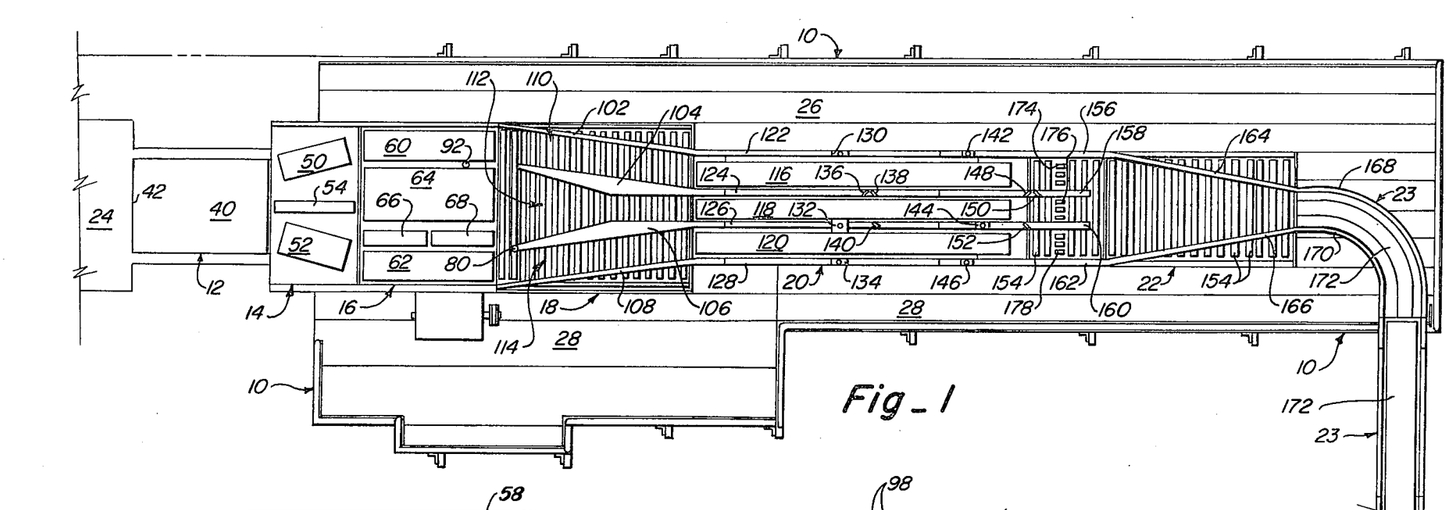
FIG. 1 is a top view of an illustrative apparatus which may be used in practicing one aspect of the present invention.

Referring now to FIG. 1, a conveyor system or apparatus is shown to comprise frame means 10 for providing a number of centrally mounted, in-line, separate conveyor stations 12, 14, 18, 20, 22, and 23; a loading platform apparatus 24; and walkways 26 and 28. The conveyor stations are arranged to receive articles conveyed, transfer the articles and discharge the articles along the conveyor system, as is shown in the art.

Figure 3A:
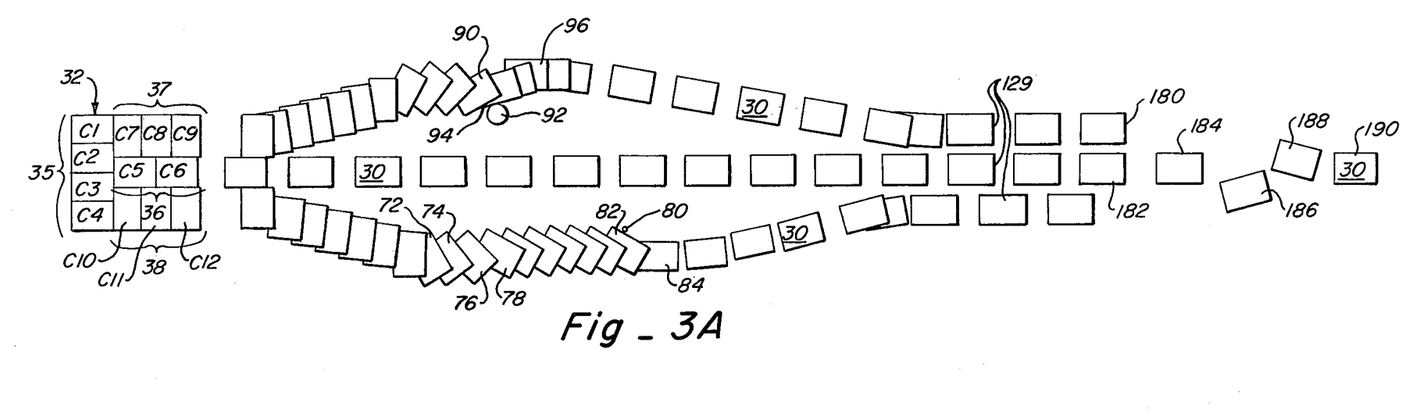
FIGS. 3A and 3B are diagrammatic views of various containers in situations which illustrate the operation of the apparatus of FIGS. 1 and 2, which also illustrate other aspects of the present invention.
Figure 3B:
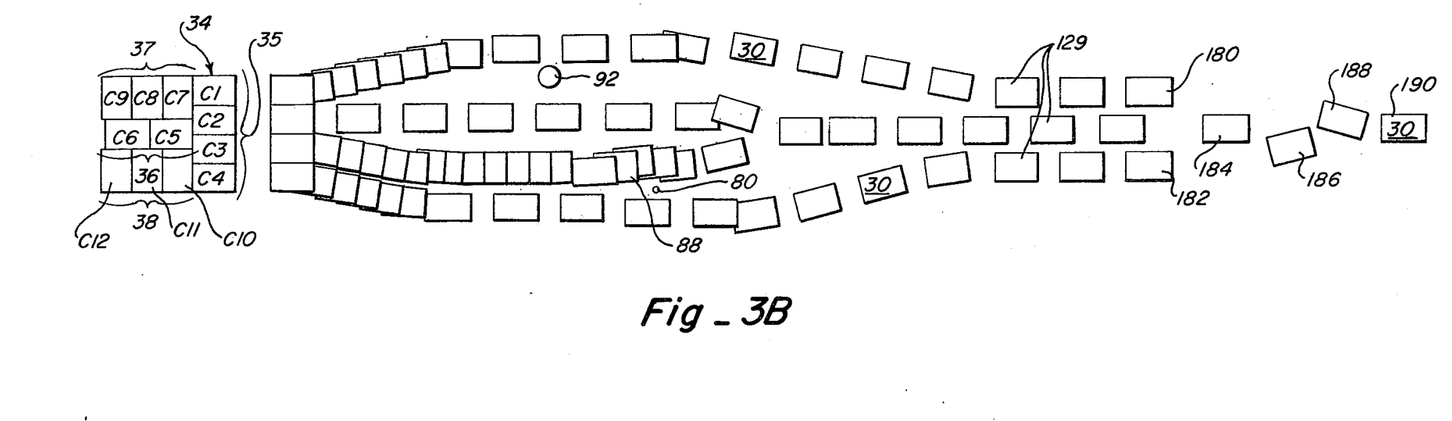

As is shown in FIGS. 3A and 3B, the conveyor system and apparatus is designed to separate a multitude of generally rectangular containers or cartons, such as beer bottle boxes 30, of similar size and rectangular shape arranged in a group abutting array, and to arrange the containers in single file for transportation to and convenient use by various processing stations. In order to utilize the present invention, the containers are generally arranged in a generally abutting relationship in a predetermined generally rectangular array in a palletized grouping of, for example, twelve such containers as shown in two alternative patterns 32 and 34 in FIGS. 3A and 3B. Both patterns have the same general configuration of a transverse row 35 of four containers, C1, C2, C3 and C4 at one end, a central row 36 of two containers C5 and C6 in the center of the pattern, and two outside rows 37 and 38, each having three containers, C7, C8 and C9 and C10, C11, and C12, respectively. The containers of rows 35 and 36 have longitudinal orientations because these containers have their longitudinal axes oriented parallel to the general path of movement of the conveyor (left to right), and the containers of rows 37 and 38 have transverse orientations because their longitudinal axes are oriented transverse to the general direction of conveyor path.

The grouped arrays 32 and 34 are placed on the conveyor apparatus of the present invention with the central row 36 of containers leading and the outside rows 37 and 38 of containers broadside leading (FIG. 3A), or with the transverse row 35 of containers end-leading (FIG. 3B). FIGS. 3A and 3B depict various stages of separation provided by the present invention, and it should be understood that FIG. 3A illustrates the manner in which the containers of rows 36, 37 and 38 of the array are separated and converged and FIG. 3b illustrates the manner in which the containers of row 35 of the array are separated and converged.

Figure 2:
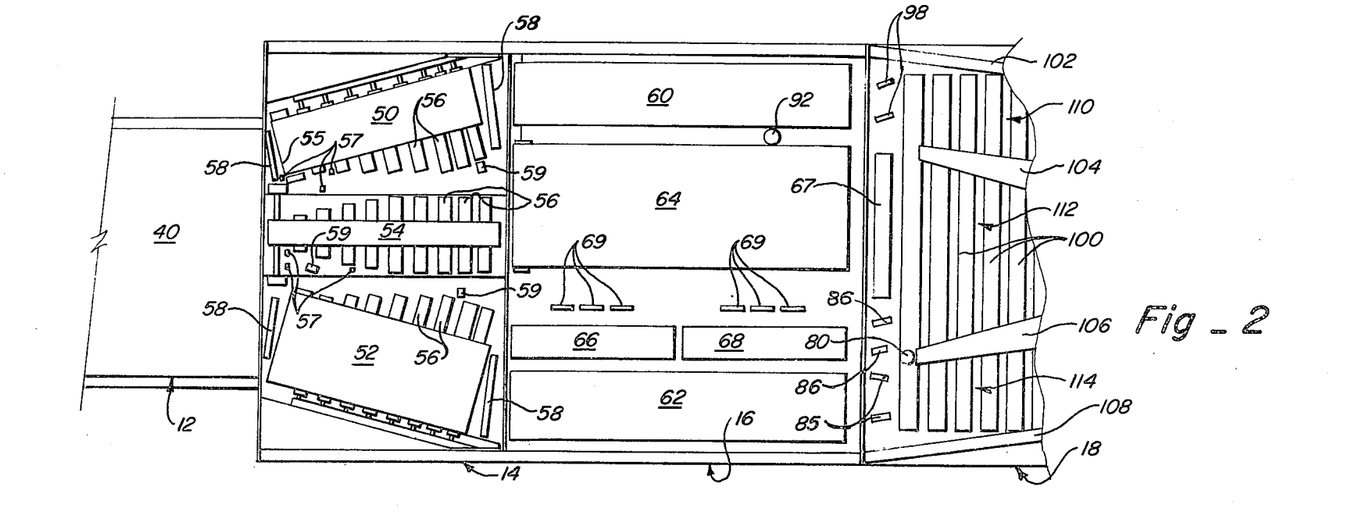
FIG. 2 is an enlarged view of a portion of FIG. 1.

As shown in FIGS. 1 and partially in FIG. 2, first conveyor station or means 12 comprises moving conveyor belt means 40 onto the rear end 42 of which the array of containers is moved or advanced off of a support surface of the loading platform apparatus 24 (by a loading apparatus, not shown). The containers of the array are sequentially engaged and separated longitudinally as a result of the generally slower speed of the unloading apparatus with respect to the speed of the belt means 40, because the containers in the array are engaged and received by the conveyor belt 40 at different times with the front containers of the array being deposited first and the rear containers of the array being deposited last.

As shown in FIGS. 1 and 2, second conveyor station or means 14 comprises a pair of relatively short length, relatively wide, uniform velocity, e.g., approximately 50 F.P.M., forwardly outwardly angled, outside conveyor belts 50 and 52; and a relatively short length, relatively narrow width, straight line, central conveyor belt 54 having the same velocity as belts 50 and 52. conveyor belt 54 having the same velocity as belsts 50 and 52. Belt 54 is arranged with its innermost edge coincident with a center line through conveyor station 14, and its width is sufficient to advance containers C2, C5 and C6 longitudinally forward in a line. Belt 50 is of width sufficient to advance containers C1, C7, C8 and C9 outward and transversely space these containers from the line advanced by belt 54. The rear end 55 of belt 50 is spaced a transverse distance from belt 54 sufficient to move the transversely oriented containers in row 37 outward, but to avoid any significant adverse turning effect on container C2. Belt 52 is sufficiently wide to advance containers C3 and C4 in two outside lines and to advance the transverse containers of row 38 to the outside. Belt 52 also transversely spaces the containers it advances from the line of containers advanced by belt 54.

Belts 50, 52 and 54 may be supported over their length by a plurality of rollers 56, which extend beyond the edge of the belts and support that portion of the containers not in contact with the belts. In addition, other areas between conveyor belts over which the containers travel may be provided with various omnidirectional rollers 57, support rollers 58 and wheels 59 to continuously maintain the containers in a horizontal plane with the conveyor belt surface and provide appropriate directional guiding.

As can be understood also from FIGS. 3A and 3B, the arrangement of conveyor station 14 is such that belt 54 transfers only containers C5 and C6 in the center row of the array and the container C2 in row 35; belt 50 transfers only containers C7, C8 and C9 in row 37 and the container C1 in row 35; and belt 52 transfers only containers C10, C11 and C12 in row 38 and the two containers C3 and C4 in row 35. Thus, the conveyor belts at station 14 transversely separate the array of twelve containers into three groups of three, four and five containers transferred respectively on belts 54, 50 and 52. In addition, the conveyor belts at station 14 comprise a means for arranging the containers in four separate lines of containers or paths of movement for the containers. The containers of row 37 and container C1 or row 35 form one line or path of movement of four containers, the containers of row 36 and container C2 of row 35 form another line or path of movement of three containers, the containers of row 38 and container C4 of row 35 form another line or path of movement of four containers, and containers C3 of row 35 forms still another line or path of movement. The belts 50, 52 and 54 also serve as a means for transversely spacing the containers in the paths of movement relative to the other containers in other paths of movement. The multiple paths of movement are generally parallel in the direction of movement of the conveyor system although the path of movement of the containers of row 37 and container C1 is changed to angle slightly outward because of the angle of belt 50 and the paths of movement of the containers in row 38 and containers C3 and C4 is changed to angle slightly outward because of the angle of belt 52. As containers are transferred by belts 50 and 52 and advanced outward, certain containers are slightly changed in orientation, and this change in orientation is useful in subsequently effecting a common orientation of all the containers in the array, as will be subsequentally understood more completely. The outward angled paths of movement also causes some varying longitudinal spacing of the containers as compared to path of movement of containers C2, C5 and C6, since the outward angled paths of movement are slightly greater in distance than the center path of movement. Since belts 50, 52 and 54 move faster than belt 40, conveyor station 14 causes further longitudinal spacing between the containers in each of the separate paths of movement.

As shown in FIGS. 1 and 2, third conveyor means or station 16 comprises a pair of relatively high velocity, e.g., approximately 200 F.P.M., outside, straight line conveyor belts 60 and 62; a central relatively wide, relatively slow velocity, e.g., approximately 100 F.P.M., straight line conveyor belt 64; and a pair of central, relatively narrow, aligned, straight line conveyor belts 66 and 68 of different velocities, e.g., approximately 100 F.P.M. and approximately 200 F.P.M., respectively. Since all the conveyor belts of station 16 operate at higher velocities than the conveyor belts of station 14, the containers are further longitudinally spaced at station 16 as they are transferred. Belt 60 is sufficiently narrow to transfer the longitudinally oriented container C1 in row 35. Belt 60 also contacts and advances the outer portion of the containers in row 37. Belt 64 is sufficiently wide and its outer edge is arranged to contact and transfer the inner portion of the containers of row 37 as they are received from conveyor station 14. The width of belt 64 is sufficient to longitudinally advance the containers C2, C5 and C6. Belts 62, 66 and 68 are arranged to contact and transfer the containers of row 38. Belts 66 and 68 occupy positions to advance the container C3 and belt 62 is in a position to advance container C4. Roller 67 and wheels 69 may be employed to support portions of the containers not in contact with the belts as the containers are advanced through the conveyor station 16.

Shown in FIG. 3A, the combination of belts 62 and 66 operating at different speeds turn the transverse oriented containers in row 38 from a transfer position at the rear end of belt 62 to variously generally forwardly angled positions at 72, 74, 76 and 78. The turned containers of row 38 are transferred in the position 78 past the front end of the belts 62 and 68 where a turning post 80 is mounted on a center line between belts 62 and 68 to engage the rear portion 82 of the containers to turn the containers into a generally longitudinally extending orientation 84, and align the containers into one line or path of movement of containers near the rear of conveyor station 18. Wheels 85 (FIG. 2) assist in maintaining these containers in the line or path of movement. The rear end of container C3 is advanced longitudinally ahead of the front end of container C2 because belt 68 operates at a higher speed than belt 64, thus longitudinally offsetting containers C2 and C3. Directional wheels 86 (FIG. 2) mounted between conveyor stations 16 and 18 guide container C3 in rearwardly outwardly angled position 88 near the front end of belt 68. The containers of row 37 are advanced by belts 60 and 64 and turned by the speed differential of belts 60 and 64 to the position 90 where a turning post 92 is mounted between belts 60 and 64 to engage the rear portion 94 of the containers to turn and align the containers into a generally longitudinally extended position 96 near the front end of conveyor station 16. Directional wheels 98 (FIG. 2) help to align the turned containers of row 37 into a line or path of movement of advancing containers. The various belts and turning posts thus serve as means for turning certain of the containers to desired orientations. Containers C1 and C4 are transferred respectively by belts 60 and 62 and do not experience any significant turning effect since they are primarily already in a desired orientation in their separate paths of movement. Containers C5 and C6 are longitudinally advanced by belt 64 in their separate paths of movement.

Conveyor station 16 provides the same number, four, of generally parallel separate paths of movement as supplied by station 14. The turning effect described for the certain ones of the containers with transverse orientations changes their orientation to subsequently effect a common orientation for all the containers, as will be more completely understood subsequently. In addition, the movement of three of the four paths are changed to be parallel to the general path of movement of the conveyor system. The path of movement for containers C2, C5 and C6 is not changed since the path of movement for this line of containers is generally straight ahead.

Referring again to FIG. 1 and partially to FIG. 2, fourth conveyor means or station 18 comprise a plurality of roller type conveyor means 100 operating at a relatively fast velocity, as compared with the belts of conveyor station 16, e.g., 250 F.P.M., resulting in additional longitudinal spacing of the boxes as they are transferred from conveyor station 16. Elongated, longitudinally extending, forwardly inwardly converging guide members 102, 104, 106 and 108 provide three separated guideways 110, 112 and 114 which receive respectively, containers from row 27 and container C1; containers from center row 36 and containers C2 and C3; and containers from row 28 and container C4 as shown in FIG. 2. The containers of row 36 and containers C2 and C3, which comprises two inner lines or paths of movement of the containers may be combined into one line at guideway 112 by the guide members 104 and 106, and the guide members 104 and 106 may comprise a means for combining containers of at least two of the lines prior to all of the containers being converged into a single line. The three lines of containers provided at the front end of station 18 are formed of four containers per line to achieve equal distribution of the 12 containers in the array. The three lines of four containers each facilitates more rapid converging of the containers.

The guide members at the rear of station 18 provide four separate paths of movement for the containers, but the inward angled portion of guide members 104 and 106 provide a reduced or lesser number (three) of paths of movement for containers at the front end of station 18. As the containers in the centermost two paths of movement move through guideway 112 the orientations of certain of the containers are changed to a common orientation. The containers discharged from the front end of station 18 in the guideways 110, 112 and 114 have essentially the same longitudinal orientation, which completes the changing of the orientations of certain of the containers to a common orientation as has been described in conjunction with conveyor stations 14, 16 and 18. As the containers enter the three guideways 110, 112 and 114, the direction of at least three of the four paths of movement are changed slightly. The two center paths of movement have been combined into a single path by changing the direction of at least one of the two center paths of movement. The two outside paths of movement are angled slightly inward by the guide members causing a corresponding change in direction of these paths of movement.

Referring to FIG.1, fifth conveyor means or station 20 comprises three parallel, longitudinally extending belts 116, 118 and 120 having a uniform velocity, e.g., approximately 150 F.P.M., contained by longitudinally extending guideway members 122, 124, 126 and 128 having a width adapted to maintain the containers in longitudinally aligned positions on each belt shown at 129 in FIG. 3. The guideway members 122, 124, 126 and 128 and the belts 116, 118 and 120 provide the reduced or lesser number (three) of paths of movement. Belts 116, 118 and 120 operate at a slower speed than the rollers of station 18 and therefore slightly reduce the longitudinal separation between containers relative to one another in each of the paths of movement, although the belts at station 18 maintain and provide a longitudinal spacing between containers in the paths as they are transferred therealong.

Near the midpoints of belts 116, 118 and 120 are three conventional photoelectric retroflective devices 130, 132 and 134 or container position sensing means for providing control signals. Each retroflective device includes a light source and a light receiver and supplies an electrical signal according to the light received. Mirrors or reflectors 136, 138 and 140, associated respectively with each retroflective device 130, 132 and 134, return the light beam from the light source to the light receiver in each retroflective device. As the containers are advanced by the belts 116, 118 and 120, the light beams of the retroflective units are interrupted. The electrical control signals representative of the containers breaking the light beams are employed to detect any sustained periods when containers are not advanced by any one of the belts 116, 118 or 120. This prolonged period of non-movement of containers would be indicative of a jam-up of the containers, high accumulation of containers, or some malfunction, and under these conditions the conveyor system may be shut off.

Near the front ends of the belts at conveyor station 20 are another group of retroflective devices 142, 144 and 146 with their associated mirrors 148, 150 and 152, respectively, which serve as container position sensing means. The retroflective devices 142, 144 and 146 provide electrical control signals as containers break the light beams and the signals are used by apparatus at conveyor station 22 to control the converging and combining of the containers into a single line, as will be next described.

Still referring to FIG. 1, sixth conveyor means or station 22 comprise a plurality of roller type members 154 operating at a relatively high velocity, e.g., approximately 200 F.P.M., to increase the longitudinal spacing of the containers received from conveyor station 20 to facilitate converging and combining the containers in single file in one line.

The front portions of guide members 122, 124, 126 and 128 extend over the rear end portion of the roller members 154 at conveyor station 22 with outside guide members 122 and 128 having terminal portions 164 and 166 inwardly forwardly angled to converge with guide members 168 and 170 of conveyor station 23 and provide a single file container guideway 172 at the front end of conveyor station 22. Thus, the station 22 provides at the rear end three separate paths of movement for the containers received and provides at the front end a single path of movement of the containers.

Near the rear end of conveyor station 22 there are bumper rollers 174, 176 and 178 in the guideways extending from belts 116, 118 and 120, respectively. The bumpers may be operated by conventional pneumatic actuators to rise vertically above the plane of the rollers 154 or may move to a level below the plane of the rollers 154. In the upward position the bumpers form a gate means for temporarily holding or preventing any containers from exiting from the guideways extending from belts 116, 118 or 120. In the lower position the containers may exit freely from the guideways.

The actuators for the bumpers 174, 176 and 178 are controlled by the electrical signals from the retroflective devices 142, 144, and 146 which are located slightly rearward from the bumpers. The purpose of the operation of the bumpers as controlled by the retroflective devices is to ensure that the containers converging from guideways at conveyor station 22 are longitudinally offset from each other so that they may intersperse with each other with a minimum of delay time to form a single file line of longitudinally oriented containers at the entrance to guideway 172 without interfering with each other so as to avoid contact or jam-up when conveyed around the curved portion of station 23. Thus, the bumpers 174, 176 and 178 and the retroflective devices 142, 144 and 146 and the control apparatus actuating the bumpers according to the signals from the retroflective units form one embodiment of a container stop and release arrangement or means for longitudinally separating and staggering the containers in each of the three separate paths of movement relative to the positions of the containers in the other of the three separate paths of movement.

The control arrangement for the bumpers is such that containers in any of the guideways are held by the bumpers until a longitudinal offset or spacing or staggering has been attained in relation to containers exiting from any of the other guideways so that interspersal may occur. Containers at 180 and 182 in FIG. 3 are illustrated as being held by the bumpers. If the containers carried by belts 116, 118 and 120 are sufficiently longitudinally offset when they pass through the light beams from retroflective devices 142, 144 and 146, none of the bumpers need be actuated to the vertical upward position. If a number of containers have lined up behind one of the bumpers it may be advantageous to release all of these containers and allow them to exit from the guideway before releasing the containers in any other of the guideways. Any type of priority arrangement for releasing the containers may be devised according to the preference of the user, but in any event, it should be appreciated that the containers in any of the three lines are allowed to be advanced only when a sufficient longitudinal spacing or offset occurs with respect to any other containers that have advanced out of the other guideways so that the containers in the three lines may be converged into one line. The containers at positions 184, 186 and 188 in FIGS. 3A and 3B illustrate the control of the container stop and release arrangement in longitudinally offsetting and staggering the containers exiting from three guideways so that the containers may be converged and combined in a commonly oriented relationship in single file in one row in a single path of movement.

It is to be understood that successive arrays of containers comprising the layers of a stack may be unloaded at conveyor station 24 so that there may be a continuous flow of containers along the conveyor apparatus. Typical apparatus may operate at a capacity of 70 to 100 containers per minute delivered at the end of conveyor station 22, although the capacity may be increased substantially if desired. As a result, the task of "depalletizing" containers and arranging the containers of a generally rectangular array in single file on a conveyor apparatus has been fully automated with a substantial decrease in the amount of time and costs required for the job.

One embodiment of the present invention has been shown and described, but it may be that those skilled in the art will forsee changes and modifications from the described embodiment. Therefore, it is intended that the appended claims cover all such changes and modifications as fall within the true spirit and scope of the invention.

What is claimed is:

1. A method of separating containers in a generally rectangular array, the array being comprised of a plurality of abutting generally rectangular shaped containers having longitudinal and transverse orientations within the array, comprising:
   advancing all the containers of the array generally in a direction generally parallel with the longitudinally oriented containers,
   transversely spacing the containers into a first plurality of lines extending generally parallel to the longitudinally oriented containers as the containers are advanced,
   turning the containers in the lines with transverse orientations to longitudinal orientations as the containers are advanced , and
   converging the longitudinally oriented containers in a longitudinal offset manner into a single line of single file longitudinally oriented containers.

2. A method as recited in claim 1 further including combining the longitudinally oriented containers in the first plurality of lines into a lesser plurality of advancing lines prior to converging the containers.

3. A method as recited in claim 2 further including longitudinally offsetting at least a few of the containers in one advancing line with respect to the containers in another advancing line prior to converging the containers.

4. A method of separating and combining a generally rectangular array of containers, each of the containers being of generally rectangular shape, the array having transverse and longitudinal rows of abutting containers with the containers in some rows being transversely oriented and the containers in other rows being longitudinally oriented, said method comprising:
   continuously advancing the containers of the array in a desired direction generally parallel to the longitudinally oriented containers in the array and generally perpendicular to the transversely oriented containers in the array,
   arranging the containers in the array into a number of transversely spaced lines extending generally in the desired direction as the containers are continuously advanced, the number of lines being the same as the maximum number of containers across the array transversely to the desired direction of advancement,
   turning the containers in each of the lines having undesired orientations to desired orientations while the containers are continuously advanced, and
   converging the containers with the desired orientations from the advancing lines into a single line of containers all having the same desired orientation.

5. A method as recited in claim 4 further including combining the containers of at least two lines as the containers are continuously advanced prior to converging the containers.

6. A method as recited in claim 4 further including aligning all containers turned to the desired orientation into one of the number of lines as the containers are continuously advanced.

7. A method of separating an array of variously oriented containers arranged in generally abutting relationship and in multiple rows in the array, rearranging the containers in a common position of orientation, and positioning the containers having the common orientation in closely adjacent longitudinally spaced relationship in single file in one row while being continuously transferred by a conveyor system along a generally longitudinally path of movement, comprising:

placing the containers in an array of containers arranged in a predetermined pattern in generally abutting relationship with some of the containers having different orientations than others of the containers and defining multiple rows of adjacent abutting containers of similar orientation,     advancing the entire array of containers onto first conveyor means 12 of said conveyor system and sequentially engaging the containers of the array with the first conveyor means so that longitudinally adjacent ones of the containers in the array are sequentially longitudinally separated and spaced from one another as the array of containers in advanced onto the first conveyor means,     continuously advancing the longitudinally separated and spaced containers from the first conveyor means to second conveyor means (14) of said conveyor system which provides multiple generally parallel separate paths of movement for the containers equal in number to the number of multiple rows of adjacent abutting containers of similar orientation in the array of containers,     further longitudinally separating the containers and changing the orientation of some of the containers to subsequently effect a common orientation for all the containers while transferring the containers from the first conveyor means to the second conveyor means and while advancing the containers along the multiple generally parallel separate paths of movement on the second conveyor means,     continuously advancing the containers in each of the multiple generally parallel separate paths of movement from the second conveyor means to a third conveyor means (16) of said conveyor system which provides a corresponding number of multiple generally parallel separate paths of movement,     further longitudinally separating the containers and further changing the orientation of some of the containers to subsequently effect a common orientation for all the containers while transferring the containers from the second conveyor means to the third conveyor means and while advancing the containers on along the corresponding multiple generally parallel separate paths of movement on the third conveyor means,     continuously advancing the containers in each of the multiple generally parallel separate paths of movement from the third conveyor means to fourth conveyor means (18) of said conveyor system which provides in part a corresponding number of multiple generally parallel separate paths of movement equal in number to the multiple generally parallel paths of movement provided by the second and third conveyor means, and which also provides in part a lesser number of multiple generally parallel paths of movement for the containers,     further changing the orientation of some of the container to complete the common orientation of all the containers and reducing the number of multiple generally parallel separate paths of movement while transferring the containers from the third conveyor means to the fourth conveyor means and while advancing the containers along the fourth conveyor means,     continuously advancing the containers in each of the reduced number of generally parallel separate paths of movement from the fourth conveyor means to a fifth conveyor means 20 of said conveyor system which provides the same reduced number of generally parallel separate paths of movement as provided by the fourth conveyor means,     longitudinally spacing the containers in each of the reduced number of generally parallel separate paths of movement while transferring the containers from the fourth conveyor means to the fifth conveyor means,     advancing the containers in each of the reduced number of generally parallel separate paths of movement from the fifth conveyor means to sixth conveyor means (22) of said conveyor system which provides in part a corresponding reduced number of generally parallel separate paths of movement, and which also provides in part a single path of movement for the containers,     longitudinally separating and staggering the positions of the containers in each of the reduced number of generally parallel separate reduced number of paths of movement of the sixth conveyor means relative to the positions of the containers in each of the other reduced number of generally parallel separate paths of movement, and     converging and combining the containers in the reduced number of generally parallel paths of movement in closely adjacent longitudinally spaced relationship in single file in one row in the single path of movement of the sixth conveyor means.

8. The invention as defined in claim 7 and further comprising an array of twelve rectangular containers and arranging the containers in two rows of three containers per row having the longitudinal axis of each of the three containers of each of the two rows extending transversely to the longitudinal path of movement, and in one row of two containers per row having the longitudinal axis of each of the two containers extending parallel to the longitudinal path of movement, and in one row of four containers having the longitudinal axis of each of the four containers extending parallel to the longitudinal path of movement.

9. The invention as defined in claim 8 and further comprising:

again changing the direction of the path of movement of the containers in at least three of the four paths of movement along the third conveyor means.

10. The invention as defined in claim 9 and further comprising:

again changing the direction of the path of movement of the containers in at least three of the four paths of movement along said fourth conveyor means.

11. The invention as defined in claim 8 and further comprising:

increasing the velocity of the containers in each path of movement along the second conveyor means relative to the velocity of the containers on the first conveyor means.

12. The invention as defined in claim 11 and further comprising:
increasing the velocity of the containers in each path of movement along the third conveyor means relative to the velocity of the containers on the second conveyor means.

13. The invention as defined in claim 12 and further comprising:
reducing the discharge velocity of the containers in one of the paths of movement relative to the discharge velocity of the containers in the other paths of movement on the third conveyor means.

14. The invention as defined in claim 13 and further comprising:
increasing the velocity of the containers in each path of movement along the fourth conveyor means relative to the discharge velocity of the containers from the third conveyor means.

15. The invention as defined in claim 14 and further comprising:
decreasing the velocity of the containers in each path of movement along the fifth conveyor means relative to the velocity of the containers on the fourth conveyor means.

16. The invention as defined in claim 15 and further comprising increasing the velocity of the containers in each path of movement along the sixth conveyor means relative to the velocity on the fifth conveyor means.

17. A container handling apparatus for separating abutting generally rectangular shaped containers in an array of multiple containers arranged in a predetermined pattern having longitudinal and transverse orientations within the array, and comprising a plurality of sequential conveyor stations each including advancing means for advancing the containers in a generally longitudinal direction along the sequential conveyor stations, and the conveyor stations additionally comprising in conjunction with said advancing means:
arranging means for arranging the containers into a plurality of transversely spaced longitudinal lines,
turning means for turning the transversely oriented containers in the lines to generally longitudinally oriented positions,
converging means for converging the longitudinally oriented containers in the plurality of transversely spaced longitudinal lines into a single line of single file longitudinally oriented containers.

18. A container handling apparatus as recited in claim 17 wherein at least one of the conveyor stations further includes spacing means in conjunction with the arranging means for transversely spacing the containers.

19. A container handling apparatus as recited in claim 17 wherein there is associated with the advancing means of at least one of the conveyor stations means for longitudinally spacing at least a portion of the containers in one of the lines in an off-set manner with respect to the containers of another of the lines.

20. A container handling apparatus as recited in claim 17 further including combining means for combining the containers of at least two of the longitudinal lines into a single line prior to the containers being advanced to the converging means.

21. A container handling apparatus as recited in claim 17 wherein the converging means includes a container stop and release apparatus for controlling advancement of the containers.

22. A container handling apparatus as recited in claim 17 wherein:
the advancing means comprises separately operable conveyor apparatus at each conveyor station and at least some of the conveyor apparatus being operable at different speeds; and
the arranging means comprises a plurality of generally transversely spaced and outwardly angled separately operable conveyor apparatus; and
the turning means comprises at least two transversely spaced and generally parallel separably operable conveyor apparatus operating at different speeds.

23. A container handling apparatus as recited in claim 22 further including container stop and release apparatus in conjunction with the converging means.

24. A conveyor system for separating an array of variously oriented containers arranged in generally abutting relationship in multiple rows in a predetermined pattern in the array, rearranging the containers in a common orientation, and positioning the containers having the common orientation in closely adjacent relationship in single file in one row while being continuously transferred by the conveyor system along a generally longitudinal path of movement, comprising:
first conveyor means (12) (40) for sequentially receiving and movably engaging the containers of the array, and for sequentially separating and longitudinally spacing adjacent ones of the containers in the array from one another as the array of containers is advanced onto the first conveyor means, and for transferring different ones of the containers therealong in longitudinally spaced relationship;
second conveyor means (14) (50, 52, 54) for receiving the different ones of the longitudinally spaced containers discharged from said first conveyor means, and for providing multiple generally parallel separate paths of movement equal in number to the number of rows of multiple rows of adjacent abutting containers of similar orientation in the array of containers, and for transferring certain ones of the containers along each one of the separate paths of movement, and for changing the orientation of certain ones of the containers to subsequently effect a common orientation of all of the containers, and for causing further longitudinal spacing between the containers in each of the separate paths of movement, and for causing varying longitudinal spacing of containers in at least one of said separate paths of movement relative to containers in the other of said separate paths of movement,
third conveyor means (16) (60, 62, 64, 66, 68) for receiving and movably engaging the different ones of the containers discharged from said second conveyor means along the multiple generally parallel separate paths of movement, and for providing corresponding generally parallel separate paths of movement for the containers therealong and for further longitudinally separating the containers, and for further changing the orientation of some of the containers to subsequently effect a common orientation for all the containers, and for transferring the containers along the corresponding multiple generally parallel separate paths of movement, fourth conveyor means (18) (102, 104, 106, 108, 110, 112, 114) for receiving and movably engaging the different ones of the containers discharged from said third conveyor means along the multiple generally parallel separate paths of movement, and for providing in part therealong corresponding generally parallel separate paths of movement equal in number to the paths of movement provided by said second conveyor means and said third conveyor means, and for providing in part therealong a lesser number of multiple generally parallel paths of movement for the containers, and for further changing the orientation of some of the containers to complete the common orientation of all the containers, and for reducing the number of multiple generally parallel separate paths of movement, and for transferring the containers along the reduced number of paths of movement, fifth conveyor means (20) (116, 118, 120, 122, 124, 126, 128) for receiving and movably engaging the different ones of the containers discharged from said fourth conveyor means along the reduced number of paths of movement, and for providing a corresponding reduced number of generally parallel separate paths of movement therealong, and for longitudinally spacing the containers relative to one another in each of the corresponding reduced number of paths of movement while being transferred therealong;

sixth conveyor means (22) (154, 156, 158, 160, 162, 164, 166, 174, 176, 178) for receiving and movably engaging the different ones of the containers discharged from said fifth conveyor means along the corresponding reduced number of separate paths of movement, and for providing in part therealong a corresponding reduced number of separate paths of movement and for providing in part therealong a single path of movement for the containers, and for longitudinally separating and staggering the containers in each of the corresponding reduced number of separate paths of movement relative to the positions of the containers in each of the other reduced number of separate paths of movement, and for converging and combining the containers in the corresponding reduced number of paths of movement in closely adjacent longitudinally spaced and commonly oriented relationship in single file in one row in a single path of movement on said sixth conveyor means.

25. The invention as defined in claim 24 and wherein said array of containers comprises 12 containers.

26. The invention as defined in claim 25 and wherein said array of containers comprises two rows of three containers per row having the longitudinal axis of the containers extending transversely to the longitudinal path of movement, one row of two containers per row having the longitudinal axis of the containers extending parallel to the longitudinal path of movement, and one row of four containers having the longitudinal axis of the containers extending parallel to the longitudinal path of movement.

27. The invention as defined in claim 26 and wherein said two rows of three containers per row are oppositely located rows extending along opposite sides of the array parallel to the path of movement, said one row of two containers per row being located between said two rows of three containers per row and extending parallel to the path of movement, and said one row of four containers being located at and extending along one side of the array transverse to the path of movement.

28. The invention as defined in claim 24 and wherein said first conveyor means (12) (40) comprises a relatively wide width conveyor belt means (40) having a width approximately equal to the width of the array of containers and being operable at a uniform velocity.

29. The invention as defined in claim 28 and wherein said second conveyor means (14) (50, 52, 54) comprises:
a first relatively narrow width, relatively short length, straight line, central conveyor belt means (54) located centrally opposite and in juxtaposition to said first conveyor means and providing a first path of movement parallel to the path of movement of said first conveyor means and having a velocity (e.g., 50 F.P.M.) greater than the velocity of said first conveyor means,
a second relatively wide width, relatively short length, forwardly outwardly angled, outer conveyor belt means (50) located opposite and in juxtaposition to one side of said first conveyor means and providing a second path of movement forwardly outwardly angled relative to the path of movement of said first conveyor means and having a velocity (e.g., 50 F.P.M.) greater than the velocity of said first conveyor means, and
a third relatively wide width, relatively short length, forwardly outwardly angled outer conveyor belt means (52) located opposite and in juxtaposition to the other side of said first conveyor means and having a width greater than said second outer conveyor belt means and providing third and fourth paths of movement forwardly outwardly angled relative to the path of movement of said first conveyor means and having a velocity (e.g., 50 F.P.M.) greater than the velocity of said first conveyor means.

30. The invention as defined in claim 29 and wherein said third conveyor means (16) (60, 62, 64, 66, 68) comprises:
a fourth relatively wide, relatively long length, straight line, centrally located conveyor belt means (64) located opposite and in juxtaposition to said first conveyor belt means (54) and providing a continuation of said first path of movement parallel to the path of movement of said first conveyor means and having a velocity (e.g., 100 F.P.M.) greater than the velocity of said first conveyor belt means to cause further longitudinal spacing of the containers carried therealong,
a fifth relatively narrow, relatively long length, straight line, outwardly located conveyor belt means (60) located opposite and in juxtaposition to said second conveyor belt means (50), and providing a continuation of said second path of movement with a change in direction parallel to the path of movement of said first conveyor means to cause further change in orientation of the containers carried therealong, and having a velocity (e.g., 200 F.P.M.) greater than the velocity of said second conveyor belt means to cause further longitudinal spacing of the containers carried therealong,
a sixth relatively narrow, relatively long length, straight line, outwardly located conveyor belt means (62) located opposite and in juxtaposition to said third conveyor belt means (52), and providing a continuation of said third path of movement with a change in direction parallel to the path of movement of said first conveyor means to cause further change in orientation of the containers carried therealong, and having a velocity (e.g., 200 F.P.M.) greater than the velocity of said third conveyor belt means to cause further longitudinal spacing of the containers carried therealong, a seventh narrow width, relatively short length, straight line, centrally located conveyor belt means (66) located inwardly adjacent said sixth conveyor belt means (62) and opposite and in juxtaposition to said third conveyor belt means (52), and providing a continuation of said fourth path of movement with a change in direction parallel to the path of movement of said first conveyor means to cause further change in orientation of the containers carried therealong, and having a velocity (e.g., 100 F.P.M.) greater than the velocity of said third conveyor belt means to cause further longitudinal spacing of the containers carried therealong, and an eighth narrow width, relatively short length, straight line, centrally located conveyor belt means 68 located inwardly adjacent said sixth conveyor belt means 62 and opposite and in juxtaposition to said seventh conveyor belt means 66, and providing a continuation of said fourth path of movement parallel to the path of movement of said first conveyor means, and having a velocity (e.g., 200 F.P.M.) greater than the velocity of said seventh conveyor belt means 66 to cause further longitudinal spacing of the containers carried therealong.

31. The invention as defined in claim 30 and wherein said fourth conveyor means (18) (102, 104, 106, 108, 110, 112, 114) comprises:
roller conveyor means located opposite and in juxtaposition to said fourth, fifth, sixth, and eighth conveyor belt means, and providing a continuation of said first, second, third and fourth paths of movement parallel to said path of movement of said first conveyor means, and having a velocity (e.g., 250 F.P.M.) greater than the velocity of said fourth, fifth, sixth and eighth conveyor belt means to cause further longitudinal spacing of the containers carried therealong, and
container guide means (86, 104, 106) associated with said roller conveyor means to intersperse containers discharged by said eighth conveyor belt means in said fourth path of movement with containers discharged by said fourth conveyor belt means in said third path of movement.

32. The invention as defined in claim 31 and wherein said fifth conveyor means (20) (116, 118, 120, 122, 124, 126, 128) comprises:
ninth, 10th and 11th, relatively long, relatively narrow width, conveyor belt means (116, 118, 120) located opposite and in juxtaposition to said roller conveyor means, and providing continuations, respectively, of said first, second and third paths of movement parallel to the path of movement of said first conveyor means, and having a common velocity (e.g., 150 F.P.M.) less than the velocity of said roller conveyor means to finally provide a common orientation of variously longitudinally spaced and staggered containers carried therealong.

33. The invention as defined in claim 32 and wherein said sixth conveyor means (22), (154, 156, 158, 160, 162, 164, 166) comprises:
roller conveyor means (154) located opposite and in juxtaposition to said ninth, tenth, and eleventh conveyor belt means (116, 118, 120,) and providing a continuation of said first, second and third paths of movement parallel to said first conveyor means, and having a velocity (e.g., 200 F.P.M.) greater than the velocity of the ninth, tenth and eleventh conveyor belt means (116, 118, 120) to cause further longitudinal spacing of the containers carried therealong, and
container guide members (158, 160, 164, 166) associated with said roller conveyor means to intersperse and arrange the commonly oriented, longitudinal spaced, containers discharged by said ninth, tenth and eleventh conveyor belt means in closely adjacent longitudinally spaced commonly oriented relationship in single file in one row in a single path of movement on said sixth conveyor means.

34. The invention as defined in claim 33 and further comprising:
container position sensing means associated with said fifth and sixth conveyor means for providing control signals indicative of numbers of conditions of containers carried therealong, and
gate means associated with said sixth conveyor means and being responsive to said control signals for temporarily holding containers against movement in any one or more of the first, second and third paths of movement to effect more uniform interspersal of the containers in single file in the single row in the one path of movement.

35. The invention as defined in claim 34 and wherein said array of containers comprises twelve containers arranged in two rows of three containers per row having the longitudinal axis of the containers extending transversely to the longitudinal path of movement, in one row or two containers per row having the longitudinal axis of the containers extending parallel to the longitudinal path of movement, and in one row of four containers having the longitudinal axis of the containers extending parallel to the longitudinal path of movement, and
the containers in the first one of the two rows of three containers being carried along one of the four paths of movement, the containers in the second of the two rows of three containers being carried along another of the four paths of movement, the containers in the one row of two containers being carried along still another of said four paths of movement, and one of each of the four containers of the one row of four containers being carried along one of each of the four paths of movement, the two containers of the one row of two containers being carried along the same first one of the four paths of movement as one of the four containers of the one row of four containers and only one container of the one row of four containers being carried along another second one of the four paths of movement, the containers carried along said first and second ones of said four paths of movement being combined into one path of movement whereby to establish three paths of movement with four containers of each of said array of containers being carried along each of the three paths of movement.

36. A method of separating and combining a generally rectangular array of containers, each of the containers being of generally rectangular shape, the array having transverse and longitudinal rows of abutting containers with the containers in some rows being transversely oriented and the containers in other rows being longitudinally oriented, said method comprising:

continuously advancing the containers of the array in a desired direction parallel to some of the containers in the array and perpendicular to the other containers in the array, arranging the containers in the array into a number of lines extending generally in the desired direction, the number of lines being the same as the maximum number of containers across the array transversely to the desired direction of advancement, turning the containers in the lines having undesired orientations to desired orientations, combining the containers of at least two lines, and converging all of the containers into a single line of containers all having the same desired orientation.

37. A container handling apparatus for separating abutting generally rectangular shaped containers in an array of multiple containers arranged in a predetermined pattern having longitudinal and transverse orientations within the array, and comprising a plurality of sequential conveyor stations each including advancing means for advancing the containers in a generally longitudinal direction along the sequential conveyor stations, and the conveyor stations additionally comprising in conjunction with said advancing means;

arranging means for arranging the containers into a plurality of longitudinal lines, turning means for turning the transversely oriented containers in the lines to generally longitudinally oriented positions, combining means for combining the longitudinally oriented containers of at least two of the longitudinal lines into a single line, and converging means for converging the longitudinally oriented containers in the plurality of lines into a single line of longitudinally oriented containers.

* * * * *

UNITED STATES PATENT AND TRADEMARK OFFICE
CERTIFICATE OF CORRECTION

PATENT NO. : 4,019,620
DATED : April 26, 1977
INVENTOR(S) : Robert Leland Frenkel; Peter Vischer and James Allen Gulka It is certified that error appears in the above-identified patent and that said Letters Patent are hereby corrected as shown below:

Col. 2, line 65, delete "belsts", and insert therefor --belts--; Col. 9, line 26, delete "in" and insert therefor --is--; and Col. 10, line 4, delete "tainer", and insert therefor --tainers--.

Signed and Sealed this nineteenth Day of July 1977

[SEAL]

Attest:

RUTH C. MASON
Attesting Officer

C. MARSHALL DANN
Commissioner of Patents and Trademarks